United States Patent
Chung

(10) Patent No.: US 6,415,337 B1
(45) Date of Patent: Jul. 2, 2002

(54) PLUG-AND-PLAY INTERFACE CIRCUIT WITH VISUAL DISPLAY

(76) Inventor: Liu Pei Chung, No. 4, Lane 181, Sec. 3, Chungshan Road, Chung-Ho City Taipei (TW)

( * ) Notice: Subject to any disclaimer, the term of this patent is extended or adjusted under 35 U.S.C. 154(b) by 0 days.

(21) Appl. No.: 09/305,371

(22) Filed: May 5, 1999

(30) Foreign Application Priority Data

Jan. 22, 1999 (TW) .................................. 88201093 U

(51) Int. Cl.$^7$ ............................................. G06F 3/00
(52) U.S. Cl. ........................................... 710/16; 710/8
(58) Field of Search ........................ 710/8–19, 100, 710/300–304, 104; 713/1, 2, 100

(56) References Cited

U.S. PATENT DOCUMENTS

| | | | | |
|---|---|---|---|---|
| 5,684,959 A | * | 11/1997 | Bhat et al. ................. | 709/224 |
| 5,923,729 A | * | 7/1999 | Dezonno .................... | 379/1 |
| 6,098,116 A | * | 8/2000 | Nixon et al. ................ | 710/8 |

* cited by examiner

Primary Examiner—Sumati Lefkowitz
(74) Attorney, Agent, or Firm—Rosenberg, Klein & Lee

(57) ABSTRACT

A plug-and-play interface circuit includes a basic plug-and-play circuit and a visual display device connected to a microprocessor of the basic plug-and-play circuit for displaying communication port information of a peripheral device connected thereto. An input device is connected to the microprocessor for receiving user's instruction to modify and change the communication port information of the corresponding peripheral device. A memory stores static display information, such as display format and fonts. The memory is controlled by the microprocessor to provide the static display information to the display device for being displayed together with the communication port information.

10 Claims, 3 Drawing Sheets

PLUG-AND-PLAY INTERFACE CIRCUIT WITH VISUAL DISPLAY

FIELD OF THE INVENTION

The present invention generally relates to a plug-and-play (PnP) interface circuit for computers or microprocessor-based systems, and in particular to a PnP interface circuit incorporating a visual display device for displaying communication port information associated with a peripheral device connected thereto.

BACKGROUND OF THE INVENTION

Nowadays, computers play a very important role in the fields of information processing, management and control. Besides the central processing unit (CPU) that performs arithmetic operation and executes commands, the architecture of a computer also includes peripheral devices for input/output operations, such as keyboard, joystick, modem, printer, scanner, card reader and bar code reader. Each of the peripheral devices is connected to and communicates with the CPU by means of an interface circuit formed as an interface card. The most common interface cards available in the market are RS-232 and RS-422.

With the development of the computer technology, the traditional interface circuits are gradually replaced by more user-friendly interface circuit, such as Plug-and-Play (PnP) interface circuit, for example Universal Serial Bus (USB) and P1394. Such an interface circuit is not only user-friendly, but is also flexible and readily expandable. The PnP interface circuit is also superior to the RS-232 and RS-422 in data transmission speed and bandwidth.

A common USB connection architecture is to connect peripheral devices to a USB controller of a host machine, such as a personal computer, by means of at least one hub which comprises an interface circuit to serve as a multiplexer between the peripheral devices and the host machine. Each time a peripheral device is connected to the hub, operation system of the host machine assigns a communication port, such as COM1, COM2, COM3, to the peripheral device through which drive program of the peripheral device access the peripheral device. The assignment of the communication port is performed by the host machine and a user of the computer system has no way to known. This causes problems for a user to efficiently and fully exploit the resources of the computer system.

Sometimes, it is possible for the user to get access to the communication port information of a peripheral device connected to the USB hub by means of a complicated software operation of the host computer. However, it requires skilled persons to perform such operations and thus causes inconvenience. Furthermore, it is not possible heretofore for the user to directly get aware of the communication port information from the corresponding peripheral device. This is particular inconvenient in an industrial control system in which peripheral devices may be located far away from the host machine. Without being capable to get aware of the communication port information from each peripheral device, the user must get back to the host machine to access the information. This is very troublesome for the user in installing the system. In addition, to get the information of the communication ports of the peripheral devices from the host machine as is adapted in the prior art, the peripheral devices must be of different types, otherwise it would be even more difficult to understand the association of each communication port with the peripheral devices and it is impossible to monitor the operation of the system.

It is thus desirable to provide a PnP interface circuit incorporating visual display device for overcoming the problems discussed above.

SUMMARY OF THE INVENTION

Accordingly, an object of the present invention is to provide a plug-and-play interface circuit incorporating a visual display device therein for directly displaying in a peripheral device the communication port information thereof.

Another object of the present invention is to provide a plug-and-play interface circuit comprising a visual display device for instantly displaying the connection status of a corresponding peripheral device to a host machine.

A further object of.the present invention is to provide a plug-and-play interface circuit comprising an input device thereby allowing a user to directly enter command for dynamically modifying and changing communication port information of a peripheral device.

To achieve the above objects, in accordance with the present invention, there is provided a plug-and-play interface circuit comprising a basic plug-and-play circuit and a visual display device connected to a microprocessor of the basic plug-and-play circuit for displaying communication port information of a peripheral device connected thereto. An input device is connected to the microprocessor for receiving user's instruction to modify and change the communication port information of the corresponding peripheral device. A memory stores static display information, such as display format and fonts. The memory is controlled by the microprocessor to provide the static display information to the display device for being displayed together with the communication port information.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
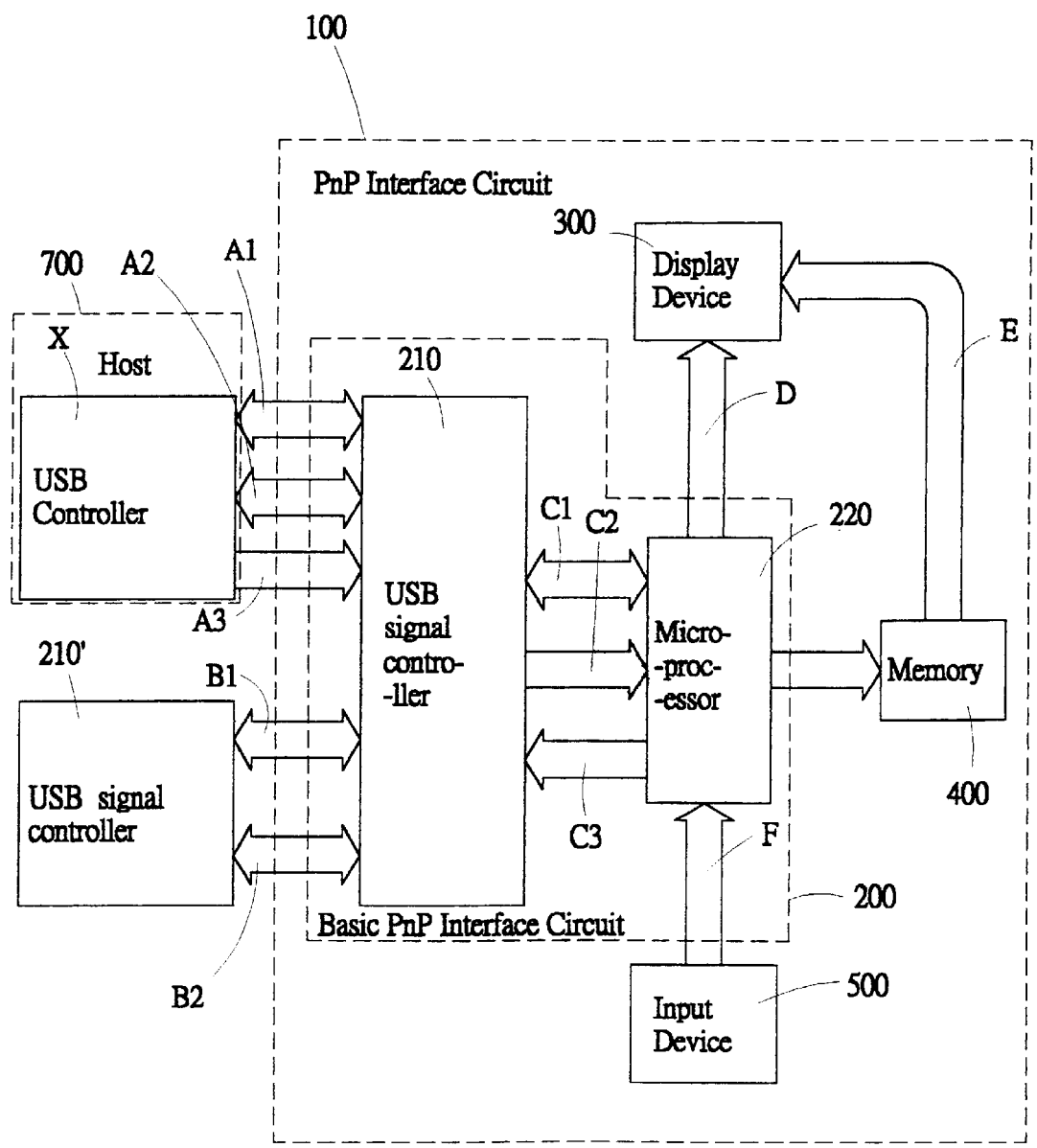
FIG. 1 is a block diagram of a plug-and-play circuit with visual display in accordance with the present invention.

With reference to the drawings and in particular to FIG. 1, wherein a plug-and-play (PnP) interface circuit with visual display constructed in accordance with the present invention, generally designated with reference numeral 100, is shown, the PnP interface circuit 100 of the present invention comprises a basic plug-and-play interface circuit 200 which is already known in the art and visual display means 300 connected thereto. For purpose of distinction and simplification, the basic plug-and-play interface circuit 200 will be referred to as the basic circuit 200, while the plug-and-play interface circuit with visual display of the present invention will be referred as the PnP circuit 100.

The visual display means 300 may comprise any known display, such as a liquid crystal display (LCD) or light emitting diodes (LEDs). The PnP circuit 100 further comprises input means 500 for receiving user's inputs and commands and memory means 400 for storage of preselected display signal associated with operation of the PnP circuit 100, such as formats of display or fonts.

Figure 3:
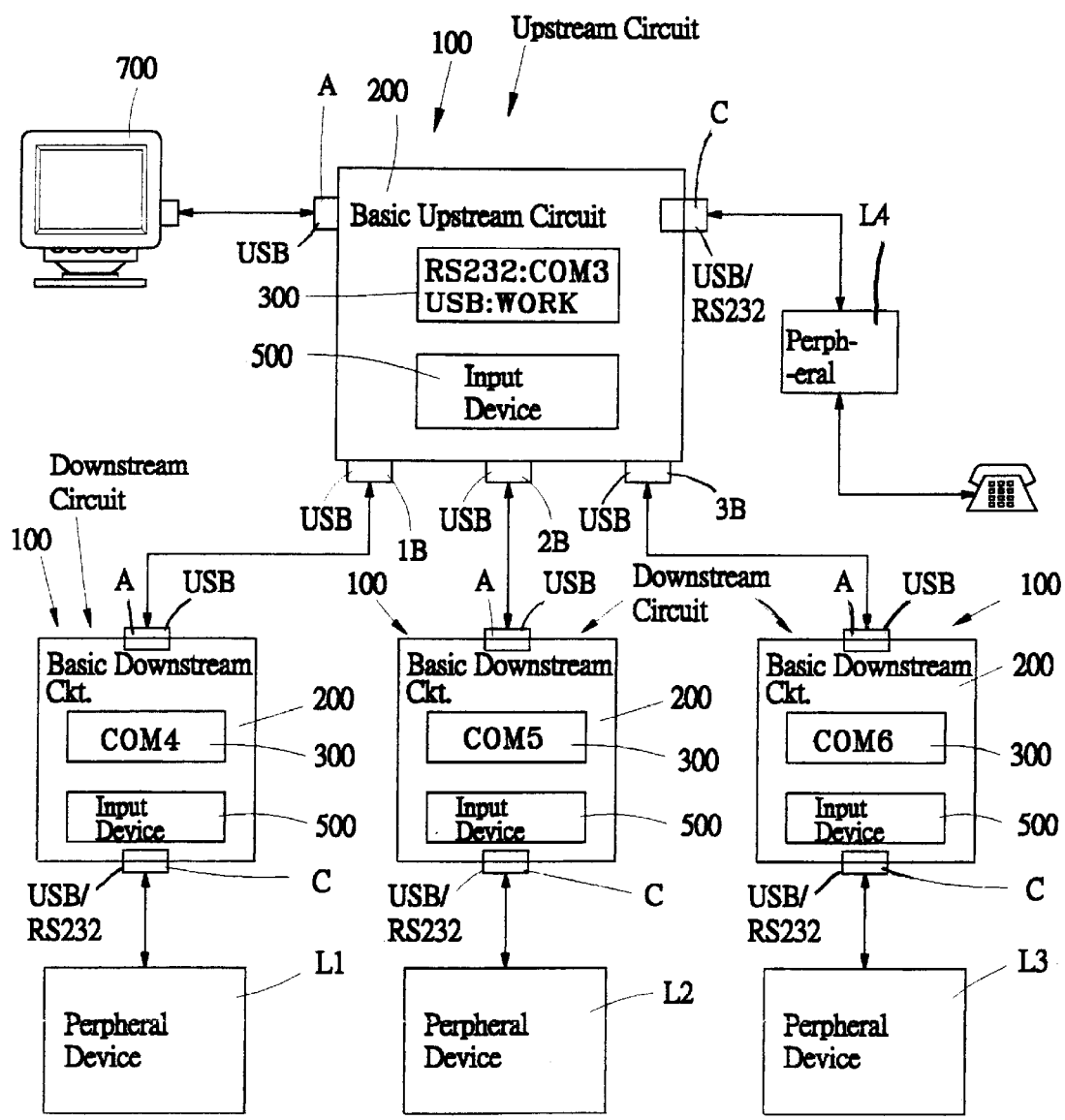
FIG. 3 is a schematic view showing peripheral devices connected to a host computer via a hub incorporating the plug-and-play circuit of the present invention.

The PnP circuit 100 may serve as a hub for connecting a number of peripheral devices L1, L2, L3, L4 to a personal computer 700 referred to as a host machine hereinafter as shown in FIG. 3. The host machine 700 comprises a Universal Serial Bus (USB) controller X connected to a USB signal controller 210 of the basic circuit 200. The basic circuit 200 and the USB signal controller 210 that are connected directly to the host machine 700 will be referred to as "host machine side" or "upstream" basic circuit 200 and "host machine side" or "upstream" USB signal controller 210. Therefore, the PnP circuit 100 that serves as a hub is also referred to as upstream PnP circuit 100. The upstream basic circuit 200 further comprises a microprocessor 220 connected to and controlling the upstream USB controller 210. The upstream USB controller 210 is electrically connected to the host machine USB controller X via buses A1, A2, A3 for linking and transmitting plug-and-play information, peripheral device side control commands and host machine side setting information therebetween.

Each peripheral device L1, L2, L3, L4 connected to the PnP circuit 100 incorporates or is connected thereto via a PnP circuit 100 that is referred to as downstream PnP circuit 100 as shown in FIG. 3. The downstream PnP 100 comprises a basic circuit 200 which will be referred to as "downstream" or "peripheral device side" basic circuit 200 comprising a "downstream" or "peripheral device side" USB signal controller that is designated with reference numeral 210' in FIG. 1 for distinction. The upstream USB signal controller 210 is connected to the downstream USB signal controller 210' by means of buses B1, B2 for linking and transmitting peripheral device side plug-and-play information and peripheral device side control commands therebetween. Linking and transmitting information and commands mentioned above are known in the art and are not part of the invention whereby no further description will be given herein.

The microprocessor 220 of the basic circuit 200 is connected to the USB signal controller 210, 210' via buses C1, C2, C3 for receiving the host machine side setting information via the USB signal controller 210 and for linking and transmitting plug-and-play information, host machine side setting information and user input control commands.

The visual display means 300 is connected to the microprocessor 220 via a bus D for receiving signal or information therefrom regarding communication port of the corresponding peripheral device and setting information of the peripheral side interface circuit by the host machine side interface circuit.

Memory means 400 which may be any known electronic memory device, such as read only memory (ROM) or electrically erasable programmable read only memory (EEPROM), is connected to the microprocessor 220 of the basic circuit 200 for storage of pre-selected static signals or information. Such static signals are transmitted to the visual display means 300 to be displayed thereby. In accordance with the present invention, a dynamic visual signal is transmitted from the microprocessor 220 for being combined with the static signals and processed in combination by the visual display means 300 to be cooperatively shown for dynamically displaying the communication port information of the corresponding peripheral device.

The input means 500 is connected to the microprocessor 220 of the basic circuit 200 via a bus F. The input means 500 which may be a keyboard, a set of pushbuttons or other input device, receives external commands from the user for controlling the display and modify or change the communication port information of the corresponding peripheral device.

Figure 2:
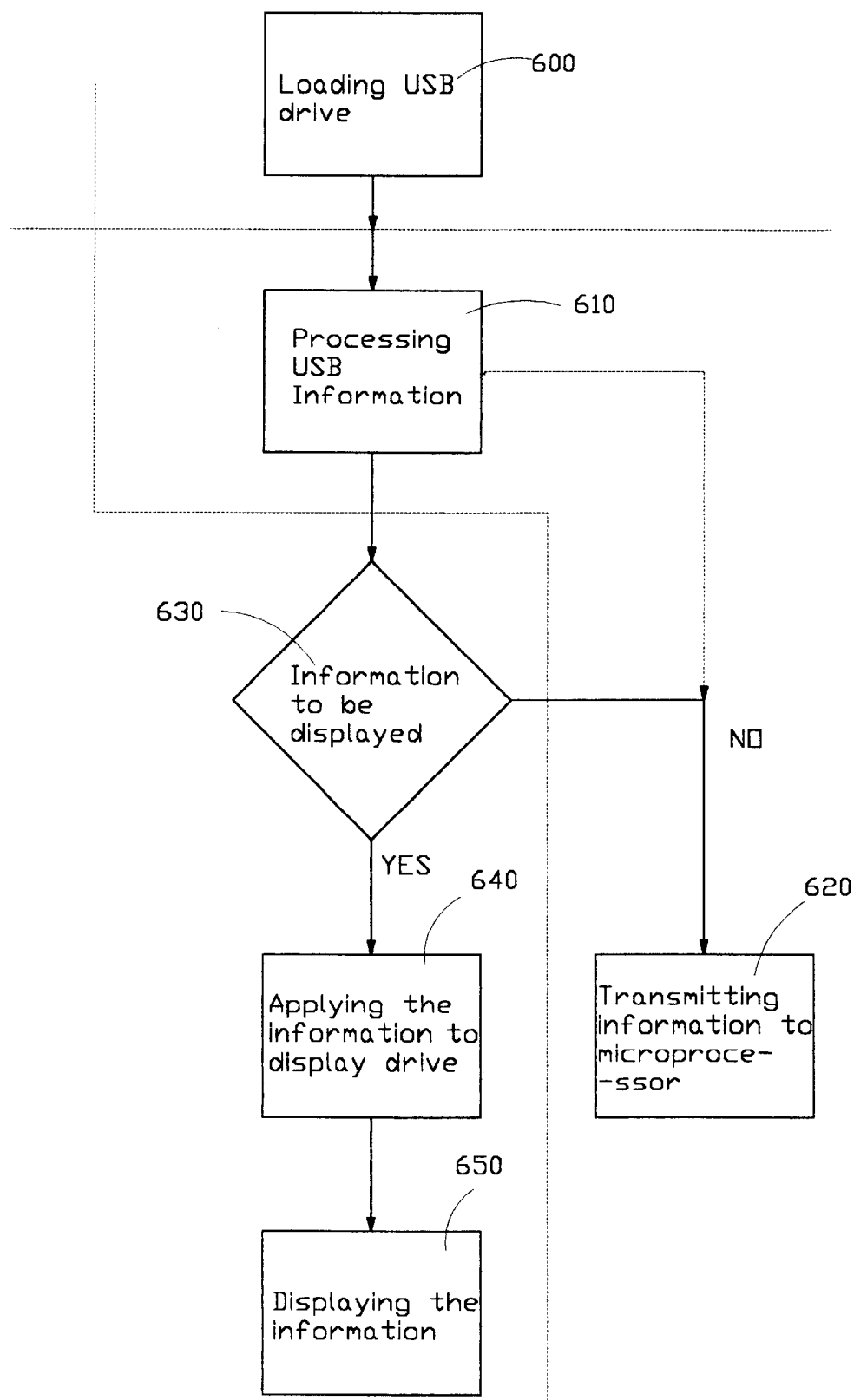
FIG. 2 is a flow chart of operation of the plug-and-play circuit of the present invention.

Referring to FIG. 2 which shows a flow chart of the operation of the PnP circuit 100 of the present invention, at step 600, the USB information and drive software is loaded. This is an operation carried out in the host machine 700. At step 610, the microprocessor 220 of the basic circuit 200 processes the USB information by means of firmware thereof. Therefore at step 620, the information is transmitted to the processor 220 and at step 630, a decision is made to determine if the information processed thereby is what to be displayed. If yes, then at step 640, the information is applied to the display drive and then carry out step 650 to display the information via the visual display means 300. Namely, the processor 220 generates the dynamic visual signal and retrieves the static signals from the memory means 400. Both signals are transmitted to the display means 300 to be displayed thereby. Furthermore, in the decision step 630, if it is determined that the information processed is not to be. displayed, then the information will be kept in the processor 220 to be further processed.

Referring to FIG. 3, wherein an application of the present invention is shown, the upstream PnP circuit 100 of the present invention is formed as a hub having three USB connectors 1B, 2B, 3B and a USB-to-RS232 adapter C. The basic circuit 200 of the upstream PnP circuit 100 comprises a further USB connector A for being electrically connected to a host machine 700 which in the embodiment illustrated is a personal computer in which the USB controller X is incorporated for receiving and transmitting setting information and USB information from the host machine 700. The connectors 1B, 2B, 3B connect the peripheral devices L1, L2, L3 by means of corresponding downstream PnP circuit 100. Each downstream PnP circuit 100 comprises a USB-to-RS232 adapter C for connection with the peripheral devices L1, L2, L3 and a USB connector A for connection with the corresponding USB connectors 1B, 2B, 3B of the basic circuit 200 of the upstream PnP circuit 100. The adapter C of the host machine side basic circuit 200 connects the peripheral device L4.

The peripheral devices may be any RS-232 type peripheral devices and in the embodiment illustrated they may be a modem, a printer, a bar code reader and a computer mouse. The display means 300 of each PnP circuit 100, including both the upstream and downstream circuits, shows the communication port information of the peripheral device L1, L2, L3, L4. For example, the display means 300 of the downstream PnP circuit 100 may show "COM4", "COM5", "COM6" related to ports of the host machine 700 to which the peripheral devices L1, L2, L3 are connected. The upstream display means 300 may show "RS-232:COM3" and "USB:WORK" indicating that the RS-232 adapter C is connected to COM3 port of the host machine 700 and the USB connector (the hub) is properly connected. This allows the user to easily install and monitor the drive programs of the peripheral devices and checks the operation of the system.

The present invention not only provides system designers or users with convenience in installing the system, but also provides the system maintenance personal with ready access to the corresponding communication port information of each peripheral device so that the maintenance personal may modify or directly set the related information of the communication port by means of the input means 500. Such modification may be transmitted to the host machine 700 via the circuits 200, 200' thereby allowing the host machine 700 to change settings thereof.

The application of FIG. 3 may be further extended to for example industrial controller that adapts PnP configuration.

Although the present invention has been described with reference to the preferred embodiment, it is apparent to those skilled in the art that a variety of modifications and changes may be made without departing from the scope of the present invention which is intended to be defined by the appended claims.

What is claimed is:

1. A plug-and-play interface circuit comprising:

a basic plug-and-play circuit comprising a communications controller for effecting communications between an upstream communication device and at least one downstream communication device, said basic plug-and-play circuit including a microprocessor for controlling said plug-and-play interface circuit;

at least one downstream communication port coupled to said communications controller for coupling a downstream communication device to said communications controller, said communications controller receiving dynamic communication port information from the downstream communication device through said downstream communication port, said dynamic communication port information including status and configuration information of the downstream communication device;

an upstream communication port coupled to said communications controller for coupling a remote upstream communication device to said communications controller, said communications controller transmitting said dynamic communication port information through said upstream communication port to the remote upstream communication device and said communications controller;

input means for receiving data from a user, said input means being electrically connected to the microprocessor of said basic plug-and-play circuit, said data from the user including instructions to modify said dynamic communication port information transmitted to the remote upstream communication device;

display means for displaying static display information combined with said dynamic communication port information to said user, said display means being electrically connected to and controlled by the microprocessor of said basic plug-and-play circuit; and memory means for storage of said static display information, said memory means being connected to and controlled by said microprocessor of said basic plug-and-play circuit for selectively conveying the static display information to the display means.

2. The plug-and-play interface circuit as claimed in claim 1, wherein the basic plug-and-play interface circuit is a universal serial bus based plug-and-play interface circuit.

3. The plug-and-play interface circuit as claimed in claim 1, wherein the basic plug-and-play interface circuit is a P1394 based plug-and-play interface circuit.

4. The plug-and-play interface circuit as claimed in claim 1, wherein the display means comprises light emitting diodes.

5. The plug-and-play interface circuit as claimed in claim 1, wherein the display means comprises liquid crystal display.

6. The plug-and-play interface circuit as claimed in claim 1, wherein the memory means comprises read only memory.

7. The plug-and-play interface circuit as claimed in claim 1, wherein the memory means comprises electrically erasable programmable read only memory.

8. The plug-and-play interface circuit as claimed in claim 1, wherein the static display information comprises fonts and display format.

9. The plug-and-play interface circuit as claimed in claim 1 wherein the input means comprises a keyboard.

10. The plug-and-play interface circuit as claimed in claim 1, wherein the input means comprises a set of pushbuttons.

* * * * *